United States Patent [19]

Jones

[11] Patent Number: 4,898,083
[45] Date of Patent: Feb. 6, 1990

[54] PISTON HEAD AND ROD ASSEMBLY FOR A GEAR PUMP DRY VALVE

[75] Inventor: Ronald L. Jones, Corinth, Miss.
[73] Assignee: Dana Corporation, Toledo, Ohio
[21] Appl. No.: 229,739
[22] Filed: Aug. 3, 1988

Related U.S. Application Data

[63] Continuation of Ser. No. 20,063, Feb. 27, 1987, abandoned.
[51] Int. Cl.$^4$ ............ F16J 1/12; F16J 7/00; F16B 3/00
[52] U.S. Cl. ................ 92/255; 403/254; 403/353
[58] Field of Search .......... 92/255, 128; 403/254, 403/353

[56] References Cited

U.S. PATENT DOCUMENTS

| | | | |
|---|---|---|---|
| 2,979,903 | 4/1961 | Beck | 92/255 X |
| 3,951,048 | 4/1976 | Bloom et al. | 92/255 X |
| 4,004,499 | 1/1977 | Beck | 92/255 X |
| 4,024,802 | 5/1977 | Koppa | 92/255 |
| 4,131,381 | 12/1978 | Alberts | 403/353 |
| 4,142,809 | 3/1979 | Shell | 403/353 X |
| 4,225,261 | 9/1980 | Marx | 403/353 X |

FOREIGN PATENT DOCUMENTS 720205  3/1980  U.S.S.R. ...................... 403/353

OTHER PUBLICATIONS

Davidson, A., ed., *Handbook of Precision Engineering*, vol. 6, New York, N.Y.: McGraw-Hill Book Co., Inc. 1972, p. 97.

*Primary Examiner*—Robert E. Garrett
*Assistant Examiner*—George Kapsalas
*Attorney, Agent, or Firm*—MacMillan, Sobanski & Todd

[57] ABSTRACT

A piston head and rod assembly for use, for example, in a gear pump dry valve is disclosed. A cylindrical piston head is provided with a generally oval-shaped cavity formed therein which defines a minor diameter. The cavity opens through one end of the piston head. However, a portion of the opening is blocked by a radially inwardly-extending lip. The lip defines an opening diameter which is smaller than the minor diameter of the cavity. An end portion of a piston rod includes a reduced diameter neck portion and an enlarged diameter tail portion. The neck portion has an outer diameter which is slightly smaller than the opening diameter defined by the lip, while the tail portion has an outer diameter which is slightly smaller than the minor diameter defined by the cavity. To assemble, the tail portion of the piston rod is inserted through the portion of the opening of the piston head which is not blocked by the lip into the cavity. Next, the piston rod is moved relative to the piston head such that the neck portion is received within the opening diameter defined by the lip. Thus, the tail portion is retained within the cavity behind the lip for use.

8 Claims, 3 Drawing Sheets

PISTON HEAD AND ROD ASSEMBLY FOR A GEAR PUMP DRY VALVE

This application is a continuation of my previous U.S. application Ser. No. 020,063 filed Feb. 27, 1987, now abandoned.

BACKGROUND OF THE INVENTION

1. Field of the Invention

The present invention relates in general to pumping mechanisms for supplying pressurized fluid to hydraulically actuated systems. In particular, the present invention relates to a gear pump having an inlet port shut-off valve, referred to as a dry valve, having an improved structure for a piston head and rod assembly utilized therein.

2. Description of the Prior Art

Gear pumps are well known in the art and typically include a pair of gears mounted upon respective shafts for rotation within a pump housing. The shafts are arranged such that the gears mesh within a pumping chamber disposed between an inlet port and an outlet port. One of the shafts is rotated by an external source of power so as to cause the two gears to rotate. In this manner, hydraulic fluid is drawn from a reservoir through the inlet port and is discharged at a relatively high pressure from the outlet port to the hydraulic system.

One common use for gear pumps of this type is on a refuse packing vehicle. Such a vehicle is typically driven by an internal combustion engine and includes one or more movable packing mechanisms which are hydraulically actuated. A gear pump can be connected to and driven by the internal combustion engine to generate a flow of pressurized fluid to operate the packing mechanisms. Because of its size and reliability, the gear pump is well suited to perform this function. Typically, however, such packing mechanisms are used only intermittently, requiring no flow of pressurized fluid for long periods of time. The internal combustion engine, on the other hand, is usually continuously operated Thus, for this and other uses, some means must be provided for selectively interrupting the flow of pressurized fluid from the gear pump to the hydraulic system.

One common structure known in the art for accomplishing this selective interruption includes the use of a dry valve. The dry valve is well known in the art and can simply be described as a shut-off valve disposed in the inlet port of the gear pump. When closed, the dry valve obstructs the flow of hydraulic fluid from the inlet port to the pumping chamber of the gear pump. Consequently, the flow of pressurized fluid to the packing mechanisms is interrupted, even though the gear pump is continued to be operated. While the gear pump is operated while the dry valve is closed, it is said to be operating in the dry mode. Typically, means are provided in the dry valve for permitting a relatively small amount of hydraulic fluid to flow into the pumping chamber even when the dry valve is closed. Such relatively small amount of fluid flow is necessary for lubricating and cooling the components of the gear pump while it is operated in the dry mode.

The dry valve typically includes a piston which is movable between opened and closed positions. The piston includes a piston head and a valve head secured to the opposite ends of a piston rod. The valve head is utilized to control the flow of the fluid through the inlet port, while the piston head is utilized to move the piston between the opened and closed positions. Typically, pressurized air is applied to the sides of the piston head to effect such movement. In some instances in the past, the piston head and the piston rod have been formed from a single piece of material. Such an integral structure is wasteful because a large amount of material is discarded during the formation thereof. Also, the concentricity of the head and rod portions of such an integral piston must be maintained precisely in order to insure proper operation. In other instances, the piston head and the piston rod have been formed as separate pieces joined together physically, such as by welding or adhesive, or mechanically, such as by threaded fasteners or cotter pins. Such structures add additional expense and complexity to the piston, both in materials and in assembly labor. Accordingly, it would be desirable to provide an improved piston head and rod structure which avoids all of these problems.

SUMMARY OF THE INVENTION

The present invention relates to an improved design for a piston head and rod assembly for use, for example, in a gear pump dry valve. A cylindrical piston head is provided with a generally oval-shaped cavity formed therein which defines a minor diameter. The cavity opens through one end of the piston head. However, a portion of the opening is blocked by a radially inwardly-extending lip. The lip defines an opening diameter which is smaller than the minor diameter of the cavity. An end portion of a piston rod includes a reduced diameter neck portion and an enlarged diameter tail portion. The neck portion has an outer diameter which is slightly smaller than the opening diameter defined by the lip, while the tail portion has an outer diameter which is slightly smaller than the minor diameter defined by the cavity but is larger than the opening diameter defined by the lip. To assemble, the tail portion of the piston rod is inserted through the portion of the opening of the piston head which is not blocked by the lip into the cavity. Next, the piston rod is moved relative to the piston head such that the neck portion is received within the opening diameter defined by the lip. Thus, the tail portion is retained within the cavity behind the lip for use.

It is an object of the present invention to provide an improved piston head and rod assembly for a gear pump dry valve.

It is another object of the present invention to provide such a piston head and rod assembly which is simple and inexpensive to construct and assemble.

It is a further object of the present invention to provide such a pisto head and rod assembly which functions reliably in a gear pump dry valve.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
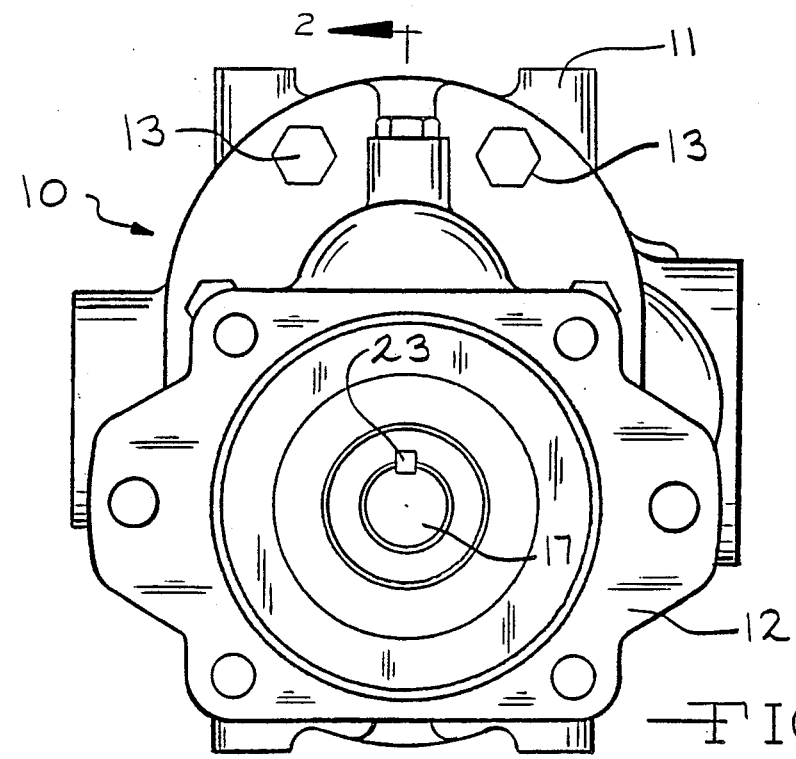
FIG. 1 is an end elevational view of a gear pump within which the piston head and rod assembly of the present invention may be utilized.
Figure 2:
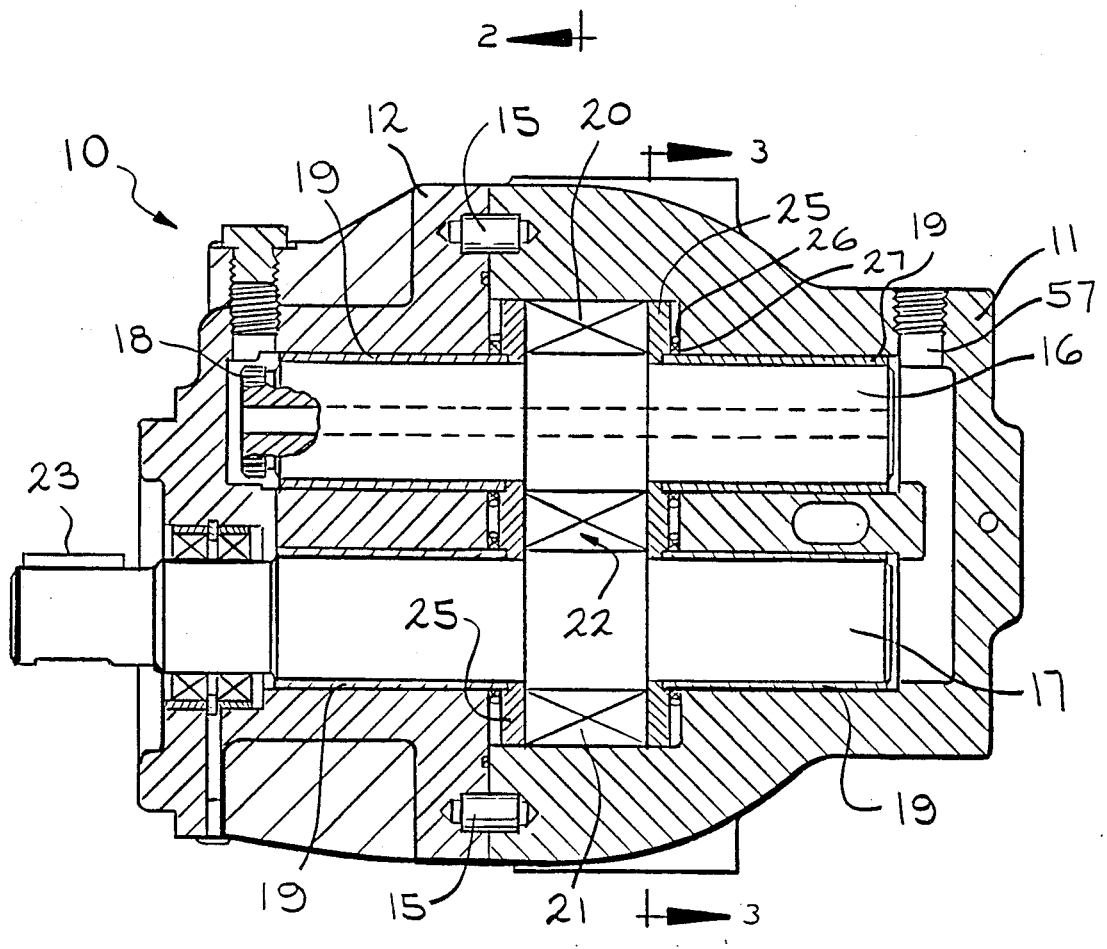
FIG. 2 is a sectional elevational view taken along line 2—2 of FIG. 1.

Referring now to the drawings, there is illustrated a gear pump, indicated generally at 10, in accordance with the present invention. As best shown in FIG. 2, the gear pump 10 includes a pump housing 11 having an end plate 12 secured thereto by a plurality of bolts 13. A plurality of dowels 15 may be provided to support and align the end plate 12 relative to the pump housing 11. Within the gear pump 10, a pair of shafts 16 and 17 are journalled for rotation. The shafts 16 and 17 are disposed in parallel fashion adjacent one another. The ends of each of the shafts 16 and 17 are supported for rotation within the gear pump 10 by respective sleeve bearings 19. The first shaft 16 can be formed having a toothed end portion 18. The toothed end portion 18 can be utilized in conjunction with a conventional sensor (not shown) to generate an electrical signal which is indicative of the rotational speed of the shaft 16.

A first gear, illustrated schematically at 20, is mounted on the first shaft 16 for rotation therewith. Similarly, a second gear, illustrated schematically at 21, is mounted on the second shaft 17 for rotation therewith. The first and second gears 20 and 21 mesh together within a pumping chamber, indicated generally at 22, formed in the gear pump 10. One end of the second shaft 17 extends through the end plate 12 outwardly of the gear pump 10. A key 23 is provided on that end of the second shaft 17. The key 23 permits the second shaft 17 to be connected to a source of power, such as a vehicle engine (not shown), for rotation. A pair of pressure plates 25 are disposed on opposite sides of the first and second gears 20 and 21. The pressure plates 25 are adapted to form a seal between the first and second gears 20 and 21 and the other components of the gear pump 10. An O-ring 26 and a back-up ring 27 are provided adjacent each of the pressure plates 25, also for sealing purposes.

Figure 3:
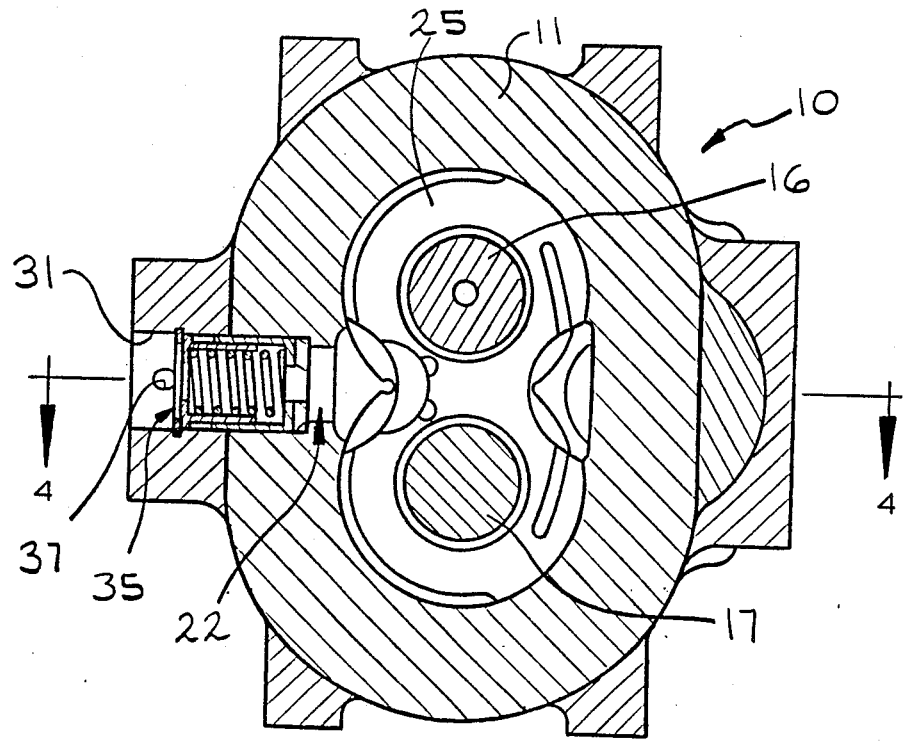
FIG. 3 is a sectional elevational view taken along line 3—3 of FIG. 2.
Figure 4:
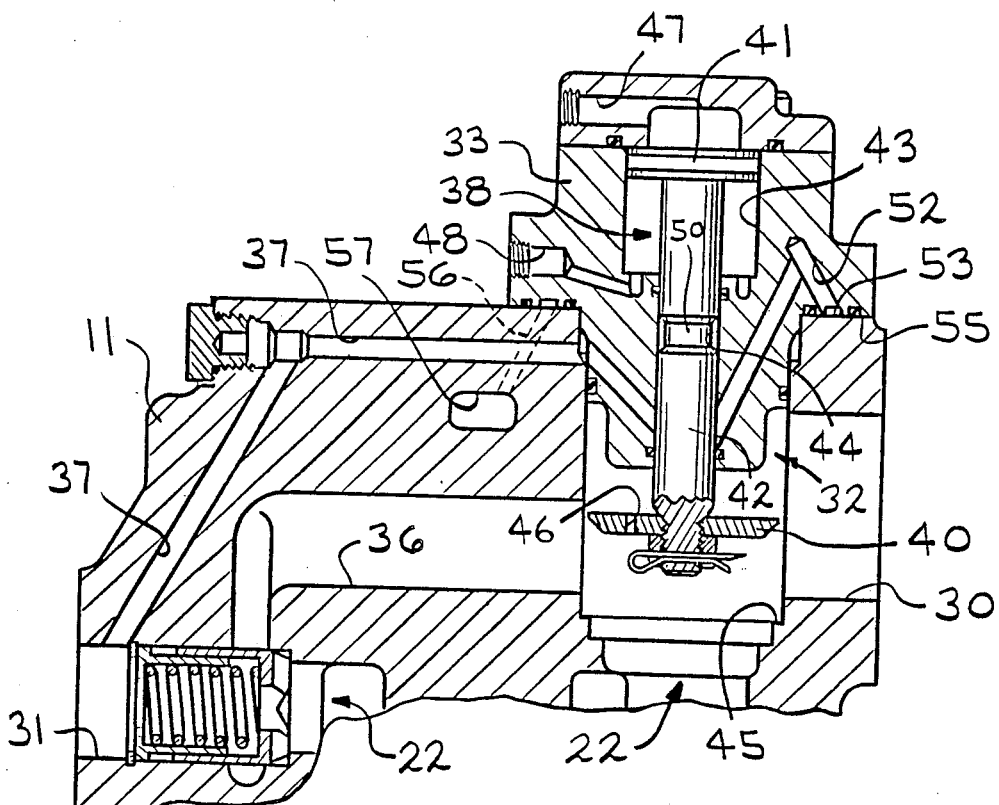
FIG. 4 is a sectional elevational view, partially broken away, taken along line 4—4 of FIG. 3, illustrating the dry valve in the opened position.

As best shown in FIG. 4, the gear pump 10 is provided with an inlet port 30 and an outlet port 31. The inlet port 30 communicates with a reservoir (not shown) containing a supply of hydraulic fluid at a relatively low pressure. The outlet port 31 communicates with a hydraulic system (not shown) adapted to be actuated by the flow of pressurized fluid from the gear pump 10. When operated, the gear pump 10 draws hydraulic fluid from the reservoir through the inlet port 30 and discharges such fluid at a relatively high pressure from the outlet port 31 to the hydraulic system. As is well known in the art, the pumping operation of the gear pump 10 is achieved by rotating the second shaft 17 and the second gear 21 in one direction (clockwise when viewing FIG. 3), thereby causing rotation of the first shaft 16 and the first gear 20 in the opposite direction (counterclockwise when viewing FIG. 3). The structure of the gear pump 10 described thus far is conventional in the art.

A dry valve, indicated generally at 32, is provided between the inlet port 30 and the pumping chamber 22. The dry valve 32 is mounted in a valve block 33 secured to the pump housing 11. The structure and operation of the dry valve 32 will be explained in detail below. Briefly, however, the dry valve 32 provides a means for selectively obstructing the flow of hydraulic fluid from the inlet port 30 to the pumping chamber 22. When the dry valve 32 is opened, such flow is not obstructed, and the gear pump 10 is enabled to generate a flow of pressurized fluid through the outlet port to the hydraulic system as described above. This is referred to as the active mode of operation of the gear pump 10. When the dry valve 32 is closed, however, the gear pump 10 is prevented from providing the flow of pressurized fluid, even though the first and second shafts 16 and 17 and the first and second gears 20 and 21 mounted respectively thereon continue to be rotated. This is referred to as the dry mode of operation of the gear pump 10.

A priority flow control valve, indicated generally at 35, is provided between the pumping chamber 22 and the outlet port 31. The priority flow control valve 35 is conventional in the art and forms no part of the present invention. The priority flow control valve 35 regulates the amount of pressurized fluid flowing through the outlet port 31 to the hydraulic system by diverting excess flow greater than the regulated flow into an excess flow passageway 36 formed in the gear pump 10. Thus, the priority flow control valve limits the amount of pressurized fluid flowing through the outlet port 31 to a predetermined regulated level. The excess flow passageway 36 communicates with the inlet port 30. Consequently, the excess flow of pressurized fluid is returned directly from the pumping chamber 22 to the inlet port 30. A feedback passageway 37 is also formed in the gear pump 10. The feedback passageway 37 extends between the outlet port 31 and the valve block 33. Pressurized fluid which is delivered from the outlet port 31 to the hydraulic system is, therefore, also provided through the feedback passageway 37 to the valve block 33. The function of the feedback passageway 37 will be described in detail below.

Referring to FIG. 4, the structures of the dry valve 32 and the valve block 33 are illustrated in detail. The dry valve 32 includes a piston, indicated generally at 38, having a valve head 40 and a piston head 41 connected to the opposite ends of a piston rod 42. The piston head 41 is enclosed within a piston head chamber 43 formed in the valve block 33, while the valve head 40 extends outwardly from the valve block 33 into the inlet port 30. The piston rod 42 is disposed within a piston rod chamber 44 formed in the valve block 33 and is axially movable therethrough. The piston 38 is adapted to reciprocate between an opened position (illustrated in FIG. 4) and a closed position (not shown). In the opened position, the valve head 40 is positioned within the inlet port 30 so as not to obstruct the flow of hydraulic fluid therethrough to the pumping chamber 22. In the closed position, however, the valve head 40 is moved into engagement with a seat 45 formed at the junction between the inlet port 30 and the pumping chamber 22. When so seated, the valve head 40 obstructs the flow of hydraulic fluid into the pumping chamber 22. A small aperture 46 is formed through the valve head 40 which permits a relatively small amount of hydraulic fluid to flow from the inlet port 30 into the pumping chamber 22, even when the piston 38 is in the closed position. This relatively small flow of hydraulic fluid through the aperture 46 is utilized for lubricating and cooling the components of the gear pump 10 when the piston 38 is in the closed position, as will be described in detail below.

As mentioned above, the piston head 41 is disposed within the piston head chamber 43 formed in the valve block 33. First and second passageways 47 and 48 are formed in the valve block 33 which communicate with the piston head chamber 43 on opposite sides of the piston head 41. The first and second passageways 47 and 48 communicate with a control means (not shown) for selectively supplying pressurized air through one of the passageways 47 and 48 and for simultaneously venting the other of the passageways 47 and 48 to the atmosphere. When pressurized air is supplied through the second passageway 48 while the first passageway 47 is vented, the piston 38 is biased to move toward the opened position illustrated in FIG. 4. When pressurized air is supplied to the first passageway 47 and the second passageway 48 is vented, the piston 38 is biased to move toward the closed position.

Figure 5:
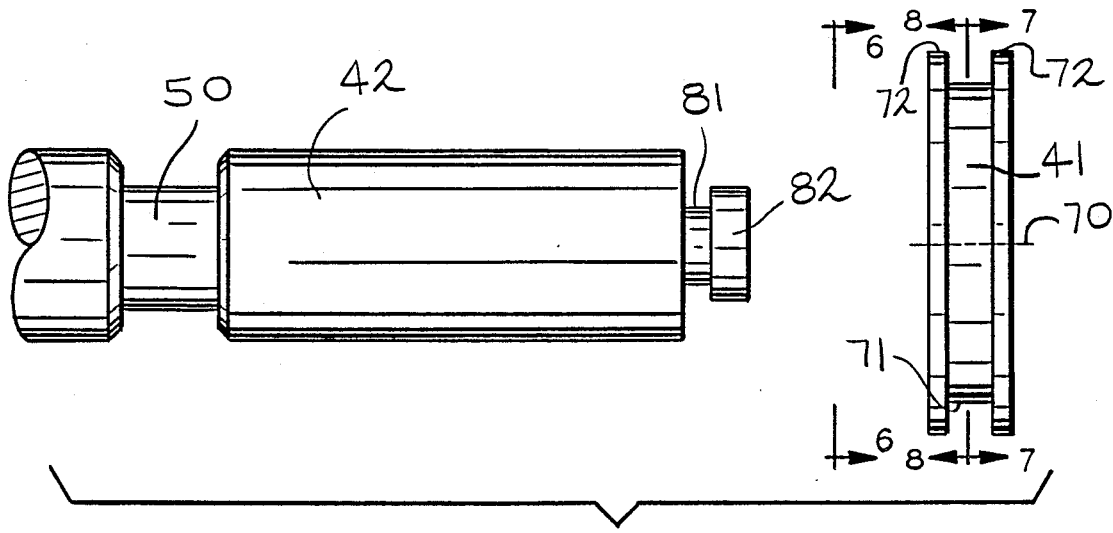
FIG. 5 is an exploded fragmentary elevational view of the piston head and rod assembly in accordance with the present invention.

The piston rod 42 has a reduced diameter portion 50 formed therein between the valve head 40 and the piston head 41. As shown in FIGS. 4 and 5, the reduced diameter portion 50 is located on the piston rod 42 such that it is always disposed within the piston rod chamber 44, regardless of whether the piston 38 is in the opened or closed positions. When the piston 38 is in the closed position, the reduced diameter portion 50 is disposed adjacent both a third passageway 51 and a fourth passageway 52 formed in the valve block 33. The third passageway 51 provides communication between the feedback passageway 37 and the piston rod chamber 44. The fourth passageway 52 provides communication between the piston rod chamber 44 and an annular groove 53 formed in an end face 55 of the valve block 33. The end face 55 sealingly abuts the outer surface of the pump housing 11 when the valve block 33 is secured thereto. Thus, the groove 53 defines an annular chamber between the valve block 33 and the pump housing 11. The groove chamber 53 communicates with a drain passageway, indicated by dotted lines at 56, formed in the pump housing 11. The drain passageway 56 communicates with a drain port 57, also formed in the pump housing 11. The drain port 57 communicates directly with the reservoir for returning the hydraulic fluid thereto. The structure and operation of the gear pump 10 is explained and illustrated in detail in co-pending application Ser. No. 131,062 filed Dec. 10, 1987 now U.S. Pat. No. 4,828,462 dated May 9, 1989, owned by the assignee of the present invention, and that disclosure is hereby incorporated by reference.

Referring now to FIGS. 5 through 9, the structure of the piston 38 is illustrated in detail, insofar as it relates to the piston head 41 and the piston rod 42. The piston head 41 is generally cylindrical in shape and is formed symmetrically about a longitudinal axis 70. The piston head 41 includes a central boy portion 71 having a pair of enlarged flange portions 72 formed integrally with the opposed ends thereof. The outer diameters of the flange portions 72 are slightly smaller than the inner diameter of the piston head chamber 43. The outer diameters of the flange portions 72 are greater than the outer diameter of the body portion 71, defining a longitudinal gap therebetween in which an O-ring (see FIG. 4) may be disposed for sealing purposes.

Figure 7:
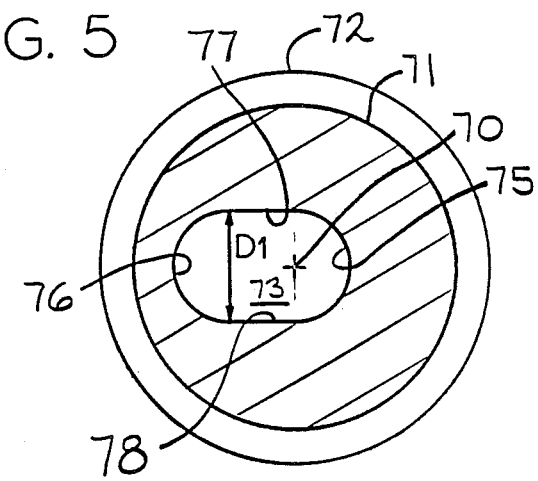
FIG. 7 is a sectional elevational view taken along line 7—7 of FIG. 5.

An internal cavity 73 is formed within the piston head 41. As best illustrated in FIG. 7, the cavity 73 has a generally oval-shaped cross section, which is defined by a pair of opposed semi-circular ends 75 and 76 connected by a pair of linear sides 77 and 78. The semi-circular ends 75 and 76 define a minor diameter of the cavity 73, illustrated as D1. One of the semi-circular ends 75 (hereafter referred to as the axially disposed end) is located relative to the longitudinal axis 70 of the piston head 41 so as to coincide with a circle formed concentrically thereabout having a diameter which is equal to the minor diameter D1 of the cavity 73. The other of the semi-circular ends 76 (hereafter referred to as the non-axially disposed end) is offset relative to the longitudinal axis 70 of the piston head 41.

Figure 6:
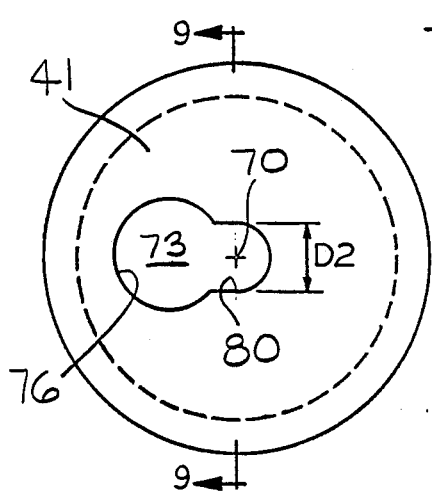
FIG. 6 is an end elevational view of the piston head taken along line 6—6 of FIG. 5.
Figure 8:
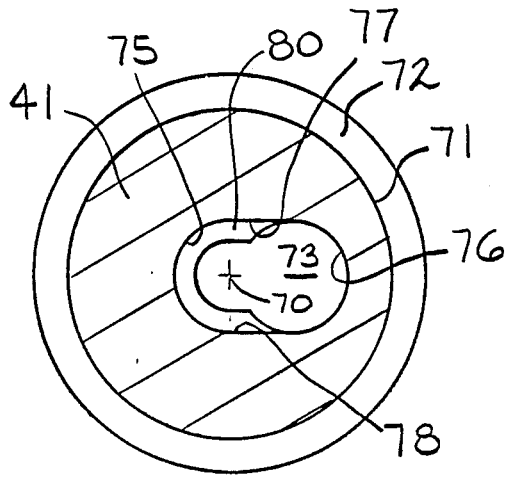
FIG. 8 is a sectional elevational view taken along line 8—8 of FIG. 5.
Figure 9:
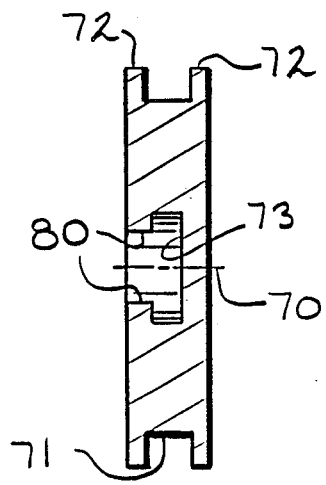
FIG. 9 is a sectional elevational view taken along line 9—9 of FIG. 6.

As best illustrated in FIGS. 6, 8, and 9, the cavity 73 opens through one end of the piston head 41. However, a portion of the opening of the cavity 73 is blocked by a radially inwardly-extending lip 80. The lip 80 is generally semi-circular in shape, extending about the axially disposed semi-circular end 75, but not the non-axially disposed semi-circular end 76. The lip 80 defines an opening diameter, illustrated as D2, which is smaller than the diameter D1. However, the portion of the opening which is not blocked by the lip 80 (i.e., which extends about the non-axially disposed semi-circular end 76) has the same diameter as the minor diameter D1 of the cavity 37.

The piston rod 42 is also generally cylindrical in shape. The piston rod 42 has an end portion which is adapted to cooperate with the cavity 73 formed in the piston head 41 to secure the piston head 41 thereto for use. The end portion of the piston rod 42 includes a reduced diameter neck portion 81 which extends axially from the piston rod 42 and an enlarged diameter tail portion 82 which extends axially from the neck portion 81. Both the neck portion 81 and the tail portion 82 are generally cylindrical in shape. The neck portion 81 has an outer diameter which is slightly smaller than the opening diameter D2 defined by the lip 80, while tail portion 82 has an outer diameter which is slightly smaller than the minor diameter D1 defined by the cavity 73.

To assemble, the tail portion 82 of the piston rod 42 is initially aligned with the non-axially disposed semi-circular end 76 of the cavity 73 and is inserted through the opening. Since that portion of the opening is not blocked by the lip 80, the tail portion 82 can easily be inserted therethrough into the cavity 73. In this position, the neck portion 81 of the piston rod 42 is disposed adjacent the lip 80. Next, the piston rod 42 is moved relative to the piston head 41 such that the tail portion 82 is moved from the non-axially disposed semi-circular end 76 to the axially disposed semi-circular end 75. Such movement is permitted because the outer diameter of the neck portion 81 can pass through the narrower opening diameter D2 defined by the lip 80. As a result, the tail portion 82 is restrained from being removed axially from the cavity 73 by the lip 80. To disassemble, the above-described process is reversed.

The structure and method of assembly described above is preferable for several reasons. First, it permits the piston head 41 and the piston rod 42 to be formed as separate components which are assembled together, rather than being machined or otherwise formed from a single piece of material. This results in a significant savings in material which would otherwise be wasted during the formation process. Furthermore, concentricity of the piston head 41 and piston rod 42 is not required, as would be essential in an integral assembly. The only requirement is that the piston head 41 provide a secure seal within the piston chamber 43. None of the portions of the piston head 41 or piston rod 42 need be formed precisely concentric with the piston chamber 43. Second, neither physical bonding, such as welding or adhesive, nor mechanical connection, such as threaded fasteners or cotter pins, are necessary to assemble the piston head 41 and the piston rod 42. Thus, the overall cost of the materials utilized to form the assembly, as well as the cost and complexity of actually assembling the piston head 41 and the piston rod 42, is reduced. Thus, the present invention provides a piston head and rod assembly which is superior to similar structures known in the art.

In accordance with the provisions of the patent statutes, the principle and mode of operation of the present invention have been explained and illustrated in its preferred embodiment. It must be understood, however, that the present invention may be practiced otherwise than as specifically explained and illustrated without departing from its spirit or scope.

What is claimed is:

1. A piston and rod assembly comprising:
   a piston head including an end surface defining a plane, an internal cavity formed within said piston head and extending through to said end surface so as to define an opening in said end surface, and a lip extending about a first portion of said opening to define a first dimension thereof and not extending about a second portion of said opening to define a second dimension thereof, said second dimension being greater than said first dimension; and
   a piston rod including a neck portion and a tail portion, said neck portion having an outer dimension which is less than said dimension, said tail portion extending from said neck portion and having an outer dimension which is greater than said first dimension and less than said second dimension, said tail portion being disposed within said cavity and retained therein by said lip such that said piston head and piston rod are movable together along an axis extending perpendicular to sail plane while permitting said piston rod to move laterally relative to said piston head.

2. The invention defined in claim 1 wherein said opening is generally oval in shape and wherein said second dimension is a minor diameter of said oval opening.

3. The invention defined in claim 2 wherein said lip extends about a semi-conductor end of said opening and said first dimension is an inner diameter of said lip.

4. A piston and rod assembly for an apparatus having a housing comprising:
   a first bore formed in said housing having an internal dimension;
   a second bore formed in said housing having an internal dimension;
   a piston head disposed in said first bore, said piston head having an outer dimension which is slightly less than said first bore internal dimension so as to permit a seal therebetween, said piston head including an end surface defining a plane, an internal cavity formed within said piston head and extending through to said end surface so as to define an opening in said end surface, and a lip extending about a first portion of said opening to define a first dimension thereof and not extending about a second portion of said opening to define a second dimension thereof, said second dimension being greater than said first dimension; and
   a piston rod disposed in said second bore, said piston rod having an outer dimension which is slightly less than said second bore internal dimension so as to permit a seal therebetween, said piston rod including a neck portion and a tail portion, said neck portion having an outer dimension which is less than said first dimension, said tail portion extending from said neck portion and having an outer dimension which is greater than said first dimension and less than said second dimension, said tail portion being disposed within said cavity and retained therein by said lip such that said piston head and piston rod are movable together along an axis extending perpendicular to said plane while permitting said piston rod to move laterally relative to said piston head, whereby said piston head and said piston rod are movable to one another while retained together to permit said piston head and said piston rod to seal respectively with said first and second bores.

5. The invention defined in claim 4 wherein said opening is generally oval in shape and wherein said second dimension is a minor diameter of said oval opening.

6. The invention defined in claim 5 wherein said lip extends about a semi-circular end of said opening and said first dimension is an inner diameter of said lip.

7. A method of forming a piston head and rod assembly comprising the steps of:
   (a) providing a piston head including an end surface defining a plane, an internal cavity formed within said piston head and extending through to said end surface so as to define an opening in said end surface, and a lip extending about a first portion of said opening to define a first dimension thereof and not extending about a second portion of said opening to define a second dimension thereof, said second dimension being greater than said first dimension;
   (b) providing a piston rod including a neck portion and a tail portion, said neck portion having an outer dimension which is less than said first dimension, said tail portion extending from said neck portion and having an outer dimension which is greater than said first dimension and less than said second dimension;
   (c) inserting the tail portion of the piston rod through the second portion of the opening end in the piston head; and
   (d) moving the tail portion such that the neck portion is received within the first portion of the opening, whereby the tail portion is retained within the cavity by the lip such that said piston head and piston rod are movable together along an axis extending perpendicular to said plane while permitting said piston rod to move laterally relative to said piston head.

8. A piston head comprising:
   an end surface;
   an internal cavity formed within the piston head and extending through to said end surface so as to define an opening in said end surface; and
   a lip extending about a first portion of said opening to define a first dimension thereof and not extending about a second portion of said opening to define a second dimension thereof, said second dimension being greater than said first dimension.

* * * * *

UNITED STATES PATENT AND TRADEMARK OFFICE
CERTIFICATE OF CORRECTION

PATENT NO. : 4,898,083

DATED : February 6, 1990

INVENTOR(S) : James R. McBurnett

It is certified that error appears in the above-identified patent and that said Letters Patent is hereby corrected as shown below:

Col. 7

Claim 1, line 13,   before "dimension" insert -- first --.

Claim 1, line 20,   change "sail" to -- said --.

Claim 3, line 2,    change "semi-conductor" to -- semi-circular --.

Col. 8

Claim 4, line 36,   after "movable" insert -- relative --.

Signed and Sealed this

Fifteenth Day of January, 1991

*Attest:*

HARRY F. MANBECK, JR.

*Attesting Officer*      *Commissioner of Patents and Trademarks*